Figure 5:
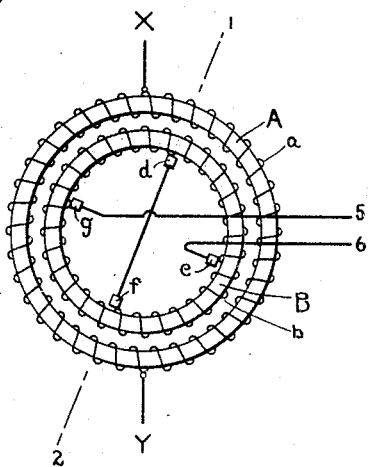

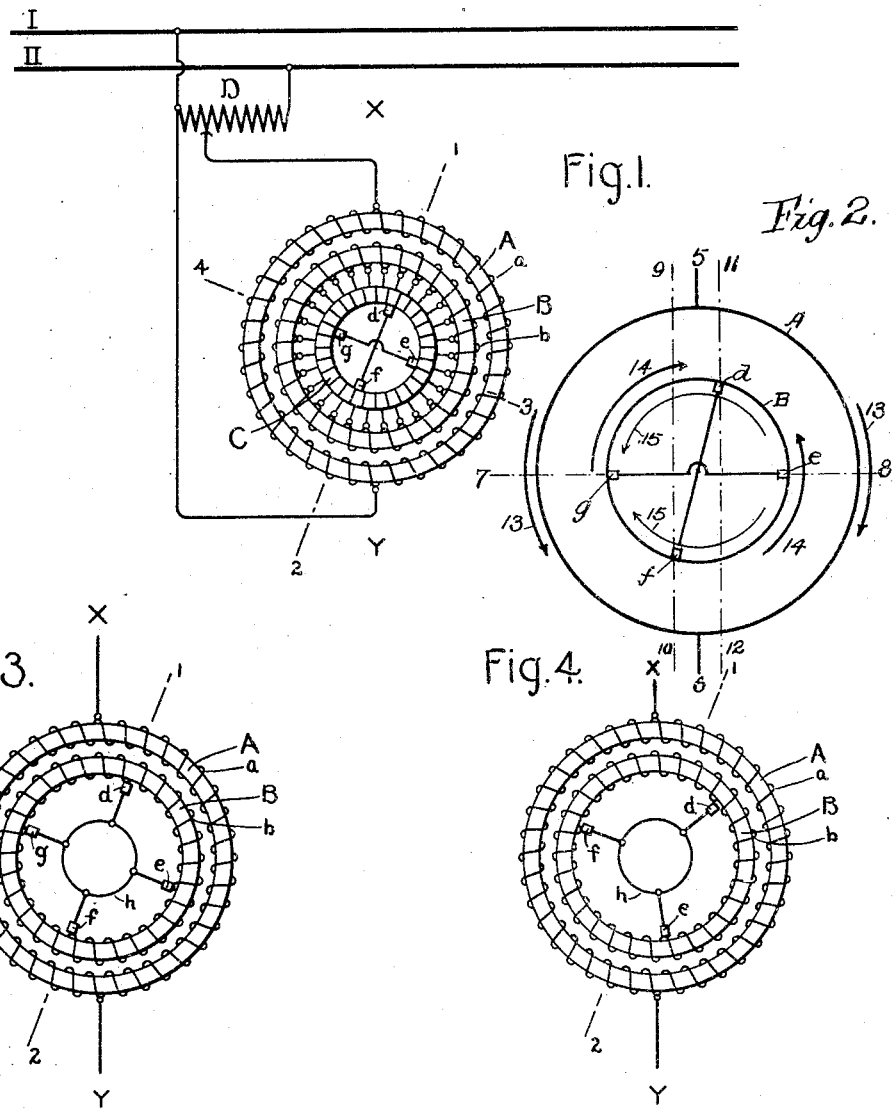

No. 787,305. PATENTED APR. 11, 1905.
M. MILCH.
ALTERNATING CURRENT MOTOR.
APPLICATION FILED OCT. 12, 1903.

2 SHEETS—SHEET 2.

Witnesses
J. Ellis Glenn
Helen Orford

Inventor
Maurice Milch
By Alun H. Davis
Atty.

No. 787,305.

Patented April 11, 1905.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

ALTERNATING-CURRENT MOTOR.

SPECIFICATION forming part of Letters Patent No. 787,305, dated April 11, 1905.

Application filed October 12, 1903. Serial No. 176,607.

*To all whom it may concern:*

Be it known that I, MAURICE MILCH, a subject of the Emperor of Austria-Hungary, residing at Schenectady, in the county of Schenectady and State of New York, have invented certain new and useful Improvements in Alternating-Current Motors, of which the following is a specification.

My invention relates to single-phase alternating-current motors, and more particularly to motors of the repulsion type. The repulsion-motor as heretofore constructed has the characteristics of the direct-current series motor—that is, it has a maximum torque at starting and the speed increases with a decrease of load. Such a motor is eminently suited for railway-work; but for certain classes of work, particularly for operating elevators and some machine-tools, it has the serious disadvantage that its speed is not limited, so that with a light load or with a load driving the motor, as is frequently the case in the operation of elevators, the speed may reach a dangerous value.

It is the object of my invention to produce a self-starting single-phase commutator-motor with a load range near synchronism. The motor which I have devised starts with several times its full-load torque and has a speed which increases with decrease of load; but when approaching synchronism the torque falls off rapidly, as in the ordinary induction-motor, and at a speed slightly above the synchronous speed the motor begins to operate as a brake, consuming mechanical power and returning energy to line. In other words, the torque curve of this motor is similar to that of the induction-motor near synchronism; but as the speed falls off the torque instead of decreasing, as it does in the ordinary induction-motor, keeps constantly increasing.

Considered in its broadest aspect, my invention consists of a single-phase dynamo-electric machine having the winding on its secondary member connected to the segments of a commutator and commutator-brushes and short-circuiting connections so arranged that the motor will have an initial starting torque and will operate at a substantially synchronous speed. In the embodiments of my invention which I have illustrated in the present application the secondary member is short-circuited through a polyphase arrangement of short-circuiting brushes disposed on the commutator. By a "polyphase arrangement" I mean an arrangement of brushes so placed and connected as to close the circuit of the rotor-winding on a plurality of lines at an angle to each other.

In its simplest forms the motor which I have devised operates with a power factor somewhat below unity; and my invention has for a further object to compensate for the magnetizing component of the primary current, so that the motor may be operated at unity power factor or may even be caused to produce leading currents in the line.

My invention will be better understood by reference to the following description, taken in connection with the accompanying drawings, in which—

Figure 6:
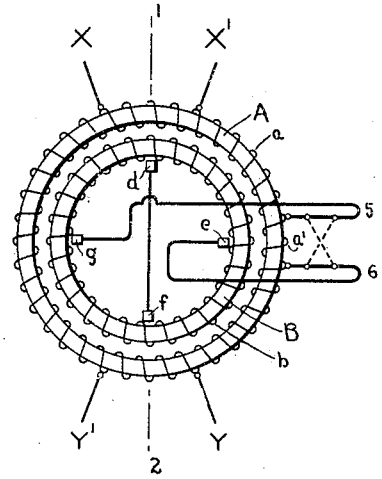
Figure 7:
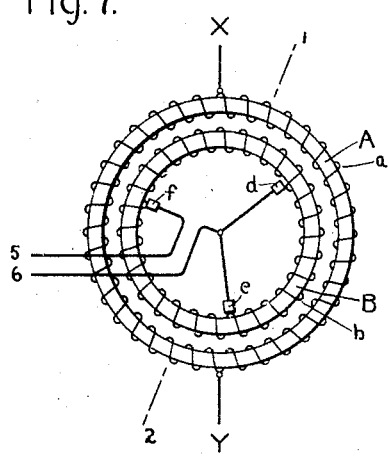
Figure 8:
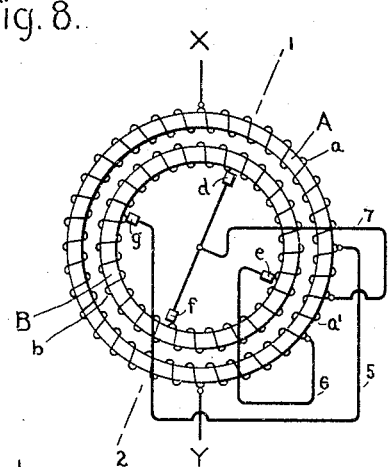
Figure 9:
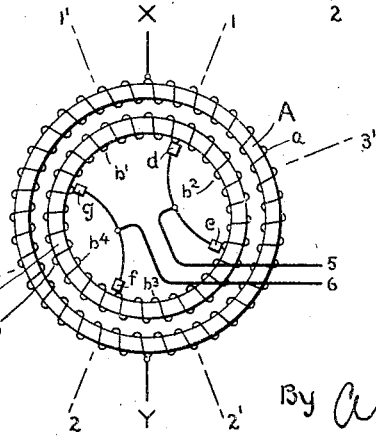

Figure 1 is a diagram illustrating one embodiment of my invention in which the winding on the secondary member is short-circuited by means of a quarter-phase arrangement of short-circuiting brushes in which the brushes which are displaced by one hundred and eighty degrees are connected in independent short circuits. Fig. 2 is an explanatory diagram showing the current distribution at any given instant in the motor-windings as shown in Fig. 1. Fig. 3 is a diagram illustrating a quarter-phase arrangement of the short-circuiting brushes in which all of the brushes are electrically connected together. Fig. 4 is a diagram illustrating a three-phase arrangement of the short-circuiting brushes. Fig. 5 is a diagram similar to Fig. 1, showing one way in which the short-circuiting connections of a quarter-phase arrangement of short-circuiting brushes may be opened for the introduction of a compensating electromotive force. Fig. 6 is a diagram similar to Fig. 5, showing one way in which the auxiliary electromotive force necessary for compensation may be obtained. Fig. 7 is a diagram showing how the compensating electromotive force may be introduced in a three-phase arrangement of the short-circuiting brushes, and Figs. 8 and 9 are diagrams showing different arrangements for introducing the compensating electromotive force into the circuit of a quarter-phase arrangement of short-circuiting brushes in which all the brushes are electrically connected.

Referring first to Fig. 1, which is a diagrammatic representation of a bipolar motor, A is the primary member provided with a winding $a$, which is shown as a simple Gramme ring connected through points located along the line $x\ y$ and through any suitable starting device, such as a compensator D, with the mains I II of a single-phase supply system. The secondary member B of the motor is provided with a winding $b$, connected to the segments of a commutator on which is disposed a quarter-phase arrangement of short-circuiting brushes comprising four brushes $d\ e\ f\ g$. The brushes which are displaced by one hundred and eighty degrees on the commutator are in this figure shown connected in independent short circuits, and the brushes are so positioned with respect to the line of the primary field that one of the lines along which the secondary winding is short-circuited will be displaced by a small angle, preferably in the neighborhood of twenty degrees from the line of the primary field. If the two brushes $e\ g$ were removed from the commutator, the motor would operate as a simple repulsion-motor at a speed limited only by the load to which it is connected. By adding a second set of short-circuiting brushes displaced by substantially ninety degrees from the brushes of the first set, or, considering the invention in its broadest aspect, by providing the secondary member with a polyphase arrangement of short-circuiting brushes, the torque curve of the motor is changed to such an extent that it may be operated like an induction-motor at a substantially constant speed.

The mode of operation may be explained as follows: In the diagram shown in Fig. 2 the primary and secondary windings of the motor A and B are indicated merely by circles for the sake of simplicity. 5 and 6 represent the terminals of the primary winding. The brushes $e$ and $g$ are shown, in order to simplify the explanation, disposed on the line 7 8 at right angles to the line of the primary terminals 5 6 instead of at right angles to the brushes $d\ f$, as in Fig. 1. The operation of the motor is affected only to a very small extent by shifting the brushes $e$ and $g$ a small amount. The dotted lines 9 10 and 11 12 are drawn through the brushes $f$ and $d$, respectively, parallel to the line of the primary terminals 5 6. Let it first be assumed that the motor is at rest and then that current is supplied to the primary terminals 5 6. The current in the primary winding A at any instant is represented by the arrows 13. A current will flow in the secondary winding in the opposite direction in accordance with the well-known transformer principle, as indicated by the arrows 14. All the ampere-turns of the primary winding A assist in producing a field in the line of the primary terminals 5 6, while only a portion of the secondary ampere-turns produces a field in this direction. Thus the portions of secondary winding which lie to the left and right of the lines 9 10 and 11 12, respectively, produce a field in the direction of the line of the primary terminals 5 6, while the ampere-turns of the secondary winding included between the lines 9 10 and 11 12 tend to produce a field at right angles to those lines and parallel to the line 7 8. It is this latter field which is the torque-producing field in ordinary repulsion-motors having but a single set of brushes; but from an inspection of Fig. 2 it is evident that when the second short circuit formed by the brushes $e\ g$ is applied to the secondary winding this field will be more or less completely damped out by the currents which it produces in the secondary winding and which are indicated by the arrows 15. If the connection between the brushes $e\ g$ is of low resistance, it is evident that the cross-field on the line 7 8 may be so nearly damped out as to form a negligible factor in considering the starting torque. Consequently, assuming that this cross-field is substantially destroyed and may be neglected, it is evident that the torque will be produced and determined by the fields parallel to the line of the primary terminals 5 6, coacting with the current in the secondary winding. The fields in this latter direction are determined by the resultant of the ampere-turns of the whole primary winding and of those portions of the secondary winding outside of the lines 9 10 and 11 12. It has been stated heretofore that a slight shift in the position of the brushes $e\ g$ has little effect upon the starting torque of the motor. This is now evident, since it may be seen from Fig. 2 that a shift of these brushes merely alters the current distribution in the secondary winding at those points which are least effective in producing a torque in conjunction with fields on the line with the primary terminals 5 6. As soon as the motor starts, electromotive forces are induced in the secondary winding by its cutting the field. An electromotive force due to this cutting is produced in the secondary winding between the brushes $e\ g$, which reduces the amount of current-flow indicated by the arrows 15 and diminishes the effectiveness of the damping action of these currents upon the cross-field. At a certain speed this induced electromotive force reaches such a value that it causes current to flow between brushes $e\ g$ in the opposite direction to that indicated by the arrows 15, and this current obviously assists instead of damping out the cross-field of the motor. The cutting of this field by the rotor-winding between the brushes $d\,f$ produces a counter electromotive force which reduces the rotor-currents, and thereby alters the field on the line 5 6. Somewhere near synchronism the two fields on the lines 5 6 and 7 8 are equal and produce a resultant revolving field. Consequently the motor operates near synchronism as an induction-motor.

The above explanation is not intended to be a complete exposition of the electrical forces operating within the motor to produce rotation, but only as one way of explaining why the speed of the motor is limited to a substantially synchronous speed, and although I believe the explanation above given to be the correct one in its general scope I of course do not wish to be bound to any particular theory of operation.

It is not necessary that the brushes should be short-circuited in independent sets, as shown in Fig. 1 of the drawings; nor is it necessary that a quarter-phase arrangement of the short-circuiting brushes be employed. In Fig. 3 I have shown a quarter-phase arrangement of the short-circuiting brushes in which all of the brushes are electrically connected together and in Fig. 4 a three-phase arrangement similarly connected. In actual construction I prefer to employ the quarter-phase arrangement; but the number of brushes for a two-pole motor may be varied between three and any desired larger number, limited only by the fact that there is a certain angle of shift corresponding to best starting conditions, which angle would be reduced by too many brushes and would be brought to zero with an infinite number. For the purposes of my invention it is only necessary that there shall be a polyphase arrangement of the short-circuiting brushes and in order to make the machine self-starting as a motor that the short-circuiting brushes shall be so positioned that at the moment when the primary circuit is closed there will be a resultant torque tending to cause rotation.

So far as the construction of the machine is concerned it will be understood that it may have any desired number of poles and that any of the constructions heretofore proposed for repulsion-motors may be used. Preferably, however, the primary member should be similar in construction to the primary member of the ordinary induction-motor and should be provided with a distributed winding. The secondary member should be similar in construction to the armature of a direct-current machine and may be provided with a winding of any of the types used in such machines.

In the forms above described the motor constituting my present invention will operate with a good efficiency at a power factor about the same as that obtained with an ordinary induction-motor. The arrangements now to be described embody a further feature of my invention which renders it possible to operate the motor at unity power factor or to compensate to any desired extent for the magnetizing component of the primary current.

Referring first to Fig. 5, which is a diagram similar to Fig. 1, it will be noted that I have opened one of the short-circuiting connections, in this case the connection between the brushes $g$ and $e$, and according to this further feature of my invention I propose to introduce between the conductors 5 and 6, to which the brushes $g$ and $e$ are connected, an electromotive force of proper magnitude and phase to produce the desired compensation. In general the arrangements embodying this present feature of my invention involve the connection of an auxiliary source of electromotive force to the secondary winding of the motor in such a manner as to compensate for the magnetizing component of the primary current. In the arrangements which I have illustrated in the present application this present feature of my invention involves the opening of the short circuit connecting the commutator-brushes and the insertion of a small auxiliary electromotive force derived from the primary circuit either by means of a transformer or directly from a few turns of the primary winding. At starting this auxiliary electromotive force will be overwhelmed by the electromotive force induced in the secondary winding by the fluctuating field component along the axis upon which the auxiliary electromotive force is impressed, and the starting conditions will not differ very much from those of the non-compensating arrangements heretofore described; but when the speed of the motor approaches synchronous speed the electromotive forces, due to transformer action, are reduced, and the small auxiliary electromotive force will then act to force currents through the secondary winding, which, if the brushes be properly located or if the position of the portion of the primary winding where the auxiliary electromotive force is obtained be properly chosen, will produce an auxiliary magnetization which will operate to assist the magnetomotive force of the primary field or if strong enough will cause a leading-current to be taken from the line. The magnitude of the compensating electromotive force will generally be so chosen that the motor will operate near synchronism at unity power factor; but evidently it may be overcompensated or undercompensated, if desired.

Fig. 6 is a diagrammatic representation of one arrangement which I have found by actual test to be satisfactory for the purposes of my invention. In the arrangement shown in this figure the auxiliary electromotive force is obtained from a portion of the primary winding $a'$, which is symmetrically disposed with reference to the short-circuiting brushes, and with such an arrangement when it is desired to reverse the motor by shifting the primary connections from points along the line $x\ y$ to points along the line $x'\ y'$ the same portion of the primary winding may be used to produce the compensating electromotive force if its connections to the short-circuiting brushes are reversed. If, however, the compensating electromotive force is obtained from any other portion of the winding, it would be necessary in reversing the direction of rotation of the motor to change the connection of the conductors 5 6 to a different portion of the primary winding having the same relation to the new axis of the primary field that the former portion had to the former axis. The compensating electromotive force may be applied to the secondary winding along any axis, only its phase will have to be chosen in accordance with the axis along which it is applied; but in the practical construction of a motor along the lines indicated I have found it more convenient to supply the auxiliary magnetizing-current through those brushes which are displaced in the neighborhood of ninety degrees from the line of primary field.

Fig. 7 shows a three-phase arrangement of the short-circuiting brushes, with the short circuit opened between the brush $f$ and the brushes $d$ and $e$. This arrangement is the same in mode of operation as that shown in Fig. 6, and an auxiliary electromotive force of the proper magnitude and phase applied between the conductors 5 and 6 will produce an auxiliary magnetization sufficient to compensate for the magnetizing component of the primary current the same as in the arrangement of Figs. 5 and 6.

In Figs. 5 and 6 the commutator-brushes, which are displaced from one another by one hundred and eighty degrees, are short-circuited by independent connections, and the source of compensating electromotive force is connected only to the short circuit joining one of the sets of the brushes. In Fig. 8 I have shown an arrangement in which the auxiliary source of electromotive force is included in a short-circuiting arrangement of brushes similar to that shown in Fig. 3, in which all of the brushes are electrically connected together. From an inspection of this figure it will be seen that the connections are the same as in Fig. 6, except that a connection is made by means of a conductor 7 between the middle point of the section $a'$ of the primary winding and the short-circuiting conductor joining the brushes located along the line 1 2.

In Fig. 9 I have shown a still different arrangement in which the auxiliary source of the electromotive force is included in a short-circuiting arrangement of brushes similar to that shown in Fig. 3. In the arrangement shown in this figure the brush $g$ is connected to the brush $f$ and the brush $d$ to the brush $e$, and with the brushes in the position shown that line of short circuit of the secondary member which is displaced by the smallest angle from the line of the primary field will be along the line $1'\ 2'$ instead of along the line 1 2, as in the other figures of the drawings. It is clear, however, that the positions of the lines of short circuit of the secondary member may be varied as desired by simply shifting the brushes. With such an arrangement of brushes as is shown in this figure only the portions $b^2$ and $b^4$ of the secondary winding are in short-circuit relation to the primary field along the axis $1'\ 2'$ and only the portions $b'$ and $b^3$ are in short-circuit relation to the field, due to the magnetomotive force $m$ of Fig. 2 along the axis $3'\ 4'$. The auxiliary electromotive force is introduced between the conductors 5 6, through which all the commutator-brushes are electrically connected, and the compensating current flows only through the portions $b'$ and $b^3$ of the secondary winding.

What I claim as new, and desire to secure by Letters Patent of the United States, is—

1. In a dynamo-electric machine, a single-phase primary member, a secondary member having its winding connected to the segments of a commutator, and commutator-brushes and short-circuiting connections so arranged that the motor will have an initial starting torque and will operate at a substantially synchronous speed.

2. In a dynamo-electric machine, a single-phase primary member, a secondary member having its winding connected to the segments of a commutator, and a polyphase arrangement of short-circuiting brushes disposed on said commutator.

3. In a dynamo-electric machine, a single-phase primary member, a secondary member having its winding connected to the segments of a commutator, and a polyphase arrangement of short-circuiting brushes disposed on said commutator, the said brushes being so positioned with respect to the line of the primary field that an initial starting torque will be produced when the primary winding is connected to a source of supply.

4. In a dynamo-electric machine, a single-phase primary member, a secondary member provided with a winding connected to the segments of a commutator, and a quarter-phase arrangement of short-circuiting brushes disposed on said commutator, said brushes being so positioned with respect to the line of the primary field that an initial starting torque will be produced when the primary winding is connected to a source of supply.

5. In a dynamo-electric machine, a single-phase primary member, a secondary member provided with a winding short-circuited on itself through a commutator, and a quarter-phase arrangement of short-circuiting brushes, the said brushes being so positioned that a line drawn through two of the brushes one hundred and eighty degrees apart on the commutator will be displaced by a small angle from the line of the primary field.

6. In a dynamo-electric machine, a single-phase primary member having a distributed winding, a secondary member having its winding connected to the segments of a commutator, and a polyphase arrangement of short-circuiting brushes disposed on said commutator, the said brushes being so positioned with respect to the line of the primary field that an initial starting torque will be produced when the primary winding is connected to a source of supply.

7. In a dynamo-electric machine, a single-phase primary member having a distributed winding, a secondary member provided with a winding connected to the segments of a commutator, and a quarter-phase arrangement of short-circuiting brushes disposed on said commutator, said brushes being so positioned with respect to the line of the primary field that an initial starting torque will be produced when the primary winding is connected to a source of supply.

8. In a dynamo-electric machine, a single-phase primary member having a distributed winding, a secondary member provided with a winding short-circuited on itself through a commutator, and a quarter-phase arrangement of short-circuiting brushes, the said brushes being so positioned that a line drawn through two of the brushes one hundred and eighty degrees apart on the commutator will be displaced by a small angle from the line of the primary field.

9. In a dynamo-electric machine, a single-phase primary member, a secondary member having its winding connected to the segments of a commutator, commutator-brushes and short-circuiting connections so arranged that the motor will have an initial starting torque and will operate at a substantially synchronous speed, and means for producing an auxiliary magnetization of proper magnitude and phase to compensate for the magnetizing component of the primary current.

10. In a dynamo-electric machine, a single-phase primary member, a secondary member having its winding connected to the segments of a commutator, commutator-brushes and short-circuiting connections so arranged that the motor will have an initial starting torque and will operate at a substantially synchronous speed, and a source of electromotive force of proper magnitude and phase to compensate for the magnetizing component of the primary current included in circuit with the commutator-brushes.

11. In a dynamo-electric machine, a single-phase primary member, a secondary member having its winding connected to the segments of a commutator, a polyphase arrangement of short-circuiting brushes disposed on said commutator, and means for producing an auxiliary magnetization of proper magnitude and phase to compensate for the magnetizing component of the primary current.

12. In a dynamo-electric machine, a single-phase primary member, a secondary member having its winding connected to the segments of a commutator, a polyphase arrangement of short-circuiting brushes disposed on said commutator, and a source of electromotive force of proper magnitude and phase connected to the winding on the secondary member so as to compensate for the magnetizing component of the primary current.

13. In a dynamo-electric machine, a single-phase primary member, a secondary member having its winding connected to the segments of a commutator, a polyphase arrangement of short-circuiting brushes disposed on said commutator, and a source of electromotive force of proper magnitude and phase to compensate for the magnetizing component of the primary current connected to the winding on the secondary member so as to produce an auxiliary magnetization along a line displaced in the neighborhood of ninety degrees from the primary field.

14. In a dynamo-electric machine, a single-phase primary member, a secondary member having its winding connected to the segments of a commutator, a polyphase arrangement of short-circuiting brushes disposed on said commutator, and a source of electromotive force of proper magnitude and phase to compensate for the magnetizing component of the primary current included in the circuit of the polyphase arrangement of short-circuiting brushes.

15. In a dynamo-electric machine, a single-phase primary member, a secondary member having its winding connected to the segments of a commutator, a polyphase arrangement of short-circuiting brushes disposed on said commutator, and a source of electromotive force of proper magnitude and phase to compensate for the magnetizing component of the primary current included in the circuit of the polyphase arrangement of short-circuiting brushes in such a manner as to produce an auxiliary magnetization along a line displaced in the neighborhood of ninety degrees from the primary field.

16. In a dynamo-electric machine, a single-phase primary member, a secondary member having its winding connected to the segments of a commutator, a quarter-phase arrangement of short-circuiting brushes disposed on said commutator, and a source of electromotive force of proper magnitude and phase to compensate for the magnetizing component of the primary current included in the circuit of the quarter-phase arrangement of short-circuiting brushes.

17. In a dynamo-electric machine, a single-phase primary member, a secondary member having its winding connected to the segments of a commutator, a quarter-phase arrangement of short-circuiting brushes disposed on said commutator, the brushes which are displaced by one hundred and eighty degrees being connected by independent short circuits, and a source of electromotive force of proper magnitude and phase to compensate for the magnetizing component of the primary current included in the short-circuiting connection between the two brushes which are located along a line displaced by the greatest angle from the primary field.

18. In a dynamo-electric machine, a single-phase primary member, a secondary member provided with a winding connected to the segments of a commutator, a polyphase arrangement of short-circuiting brushes disposed on said commutator and so positioned with respect to the line of the primary field that an initial starting torque will be produced when the primary winding is connected to a source of supply, and means for producing an auxiliary magnetization of proper magnitude and phase to compensate for the magnetizing component of the primary current.

19. In a dynamo-electric machine, a single-phase primary member, a secondary member provided with a winding connected to the segments of a commutator, a polyphase arrangement of short-circuiting brushes disposed on said commutator and so positioned with respect to the line of the primary field that an initial starting torque will be produced when the primary winding is connected to a source of supply, and a source of electromotive force of proper magnitude and phase connected to the winding on the secondary member so as to compensate for the magnetizing component of the primary current.

20. In a dynamo-electric machine, a single-phase primary member, a secondary member provided with a winding connected to the segments of a commutator, a polyphase arrangement of short-circuiting brushes disposed on said commutator and so positioned with respect to the line of the primary field that an initial starting torque will be produced when the primary winding is connected to a source of supply, and a source of electromotive force of proper magnitude and phase to compensate for the magnetizing component of the primary current included in the circuit of the polyphase arrangement of short-circuiting brushes.

21. In a dynamo-electric machine, a single-phase primary member, a secondary member provided with a winding connected to the segments of a commutator, a polyphase arrangement of short-circuiting brushes disposed on said commutator and so positioned with respect to the line of the primary field that an initial starting torque will be produced when the primary winding is connected to a source of supply, and a source of electromotive force of proper magnitude and phase to compensate for the magnetizing component of the primary current included in the circuit of the polyphase arrangement of short-circuiting brushes in such a manner as to produce an auxiliary magnetization along a line displaced in the neighborhood of ninety degrees from the primary field.

22. In a dynamo-electric machine, a single-phase primary member, a secondary member provided with a winding connected to the segments of a commutator, a polyphase arrangement of short-circuiting brushes disposed thereon, and means for including a portion of the winding of the primary member in the circuit of the polyphase arrangement of short-circuiting brushes in such a manner as to compensate for the magnetizing component of the primary current.

23. In a dynamo-electric machine, a single-phase primary member, a secondary member provided with a winding connected to the segments of a commutator, a quarter-phase arrangement of short-circuiting brushes disposed thereon, the brushes displaced by one hundred and eighty degrees being connected by independent short circuits, and means for including a portion of the winding on the primary member in the short circuit joining the commutator-brushes which are disposed along a line displaced by the greatest angle from the primary field.

In witness whereof I have hereunto set my hand this 10th day of October, 1903.

MAURICE MILCH.

Witnesses:
BENJAMIN B. HULL,
HELEN ORFORD.